Dec. 10, 1963   A. P. ZUNDEL   3,113,542
METHOD OF PRODUCING CONTAINER BODIES
Filed May 26, 1961
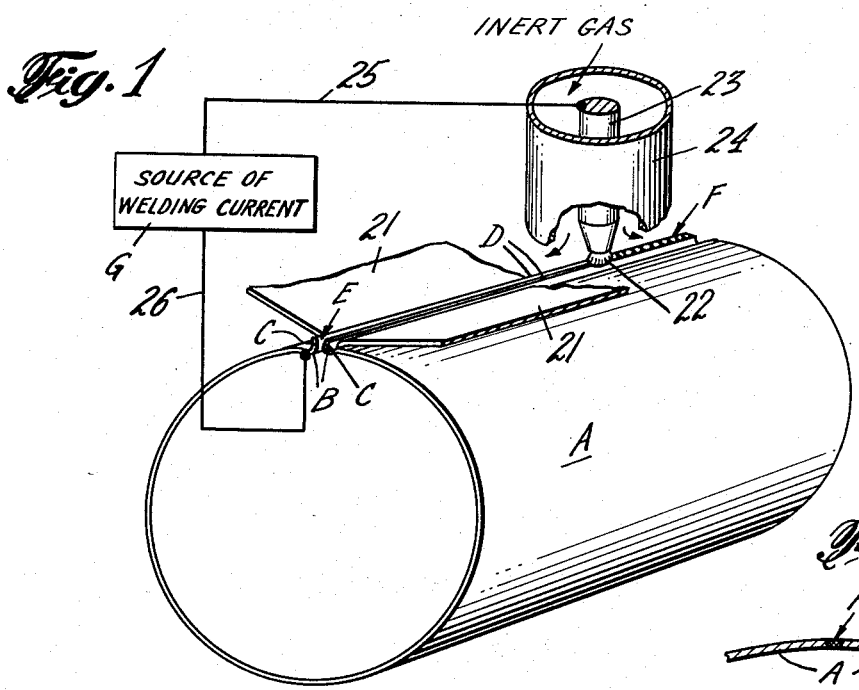
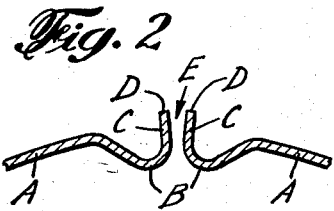
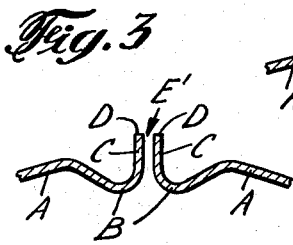
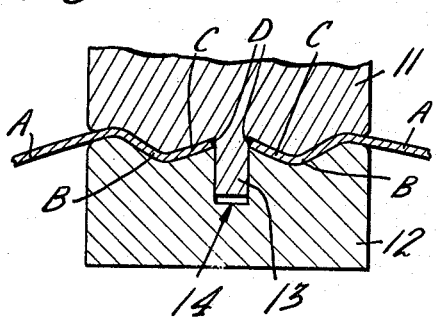
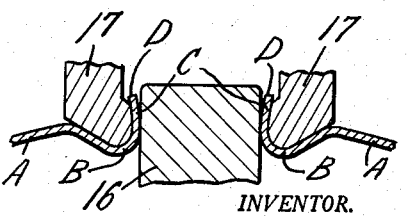
INVENTOR.
ARTHUR PHILIP ZUNDEL
BY Robert P. Auber
George W. Reiber
ATTORNEYS

United States Patent Office 3,113,542
Patented Dec. 10, 1963

3,113,542
METHOD OF PRODUCING CONTAINER BODIES
Arthur Philip Zundel, Gary, Ill., assignor to American Can Company, New York, N.Y., a corporation of New Jersey
Filed May 26, 1961, Ser. No. 112,906
6 Claims. (Cl. 113—120)

This invention relates to a method of producing tubular sheet metal can or container bodies having welded side seams and has particular reference to forming the marginal edge portions of the side seams of container bodies to provide an increase in the welding area at the opposite edges to facilitate the welding of the seams.

In the art of making tubular can or container bodies having welded side seams, a blank of sheet metal of a predetermined length according to the diameter of the container body to be manufactured, is cut, bent and formed into a tubular configuration. The opposite longitudinal edges of the formed body thereafter are brought into close proximity to each other for welding by any one of several well known methods. Invariably, however, many of the seams produced have excess weld material left at the joints which are generally irregular and rough. This requires further operations of rolling, hammering, etc., since it is highly desirable that the resulting welded joint be relatively smooth. Also, the joint should, as nearly as practicable, conform to the regular surface of the container body on both sides of the weld.

One of the methods used for producing the most desired type of seam is the edge-to-edge or butt weld, but mechanisms heretofore employed have encountered difficulties in operating at relatively high speeds such as required for commercial production. Further, it has been found that it is extremely difficult to provide edges that are perfectly straight and free of burrs or imperfections unless expensive machinery and extreme care is taken to pre-condition the edges. Furthermore, it is extremely difficult to butt weld the edges of can body side seams because of their relative thinness and the difficulty of holding the opposite edges of the can bodies in suitable contact, so that substantially perfect welds may be produced successively.

The present invention is directed to overcome the problems of welding the side seam edges of container bodies by: forming the marginal edge portions of the bodies into flanges; positioning the flanges in spaced apart relation for exposing the edges to welding heat; and flowing the molten metal created by the heat between the flange edges for welding them into seams.

An object of the invention is the provision of a method of producing can bodies having welded side seams wherein marginal edge portions of a body are formed to provide flanges which have a greater welding area than could be provided by the raw edges of the body.

Another object is the provision of such a method of producing can bodies wherein the marginal edge portions of a body are formed to provide outwardly extended flanges for exposing the raw edges of the body to the application of welding heat to fuse and produce molten metal along the edges, which flows in and fills a gap between the spaced apart flange edges for welding them into the side seam of the can body.

A further object is the provision of such a method of producing can bodies wherein the marginal edge portions of a body are formed to produce a reinforced configuration, adjacent to the side seam area to rigidify the marginal edge portions of the can body to resist the tendency of the edge portions to spring apart from a desired welding position.

Another object is the provision of such a method of producing can bodies wherein a longitudinal corrugation is formed in each of the marginal edge portions of a can body to position the flanges extending along the edges of the body to extend partially within and partially outward beyond the contour of the can body.

Numerous other objects and advantages of the invention will be apparent as it is better understood from the following description, which, taken in connection with the accompanying drawings, discloses a preferred embodiment thereof.

Referring to the drawings:

FIG. 1 is a perspective view of a tubular can body being welded along its side seam edges in accordance with the steps of the instant method invention, the view showing parts of a welding apparatus with parts broken away;

FIGS. 2, 3 and 4 are enlarged fragmentary sectional views of the side seam portions of a can body, the views showing different stages in the welding of the body;

FIG. 5 is a view similar to FIGS. 2 to 4 inclusive, showing the welded section of a side seam portion of a can body following the flattening of the corrugations adjacent to the side seam; and FIGS. 6 and 7 are enlarged fragmentary sectional views showing stages of preparing the side seam edges for welding and also showing the principal parts of mechanism for forming the seam edges, with parts broken away.

As a preferred or exemplary embodiment of the instant invention the drawings illustrate a can body A formed of ferrous sheet metal such as tin plate, black iron, or the like, having marginal side seam portions preformed and arranged to be united by welding to provide a side seam for the body.

In order to perform the steps of the instant invention, the marginal side seam portions of a can body A to be welded are formed into inwardly and outwardly curved or corrugated sections B. These sections merge into outwardly extended flange walls C which terminate in outer terminal edges D (FIGS. 1, 2, and 3).

It will be noted that with the flange walls C formed as illustrated in the drawings, they provide a greater area of the marginal edge portion of a can body for welding purposes that could possibly be realized, for example, by subjecting the edges of the body to a butt welding operation. Further, the outward extension of the flange walls C expose the terminal edges D in a substantially juxtaposed relation to the welding heat during a welding operation (FIGS. 2 and 3). Hence, in order to obtain all the advantages of the outward extensions of the flange walls C, these walls preferably are formed to flare outwardly such as radially divergent walls. This provides a slight increase in the width of a gap E at the terminal edges D than at an intermediate point or section taken between the spaced apart flange walls.

The corrugations B formed in the marginal edge portions adjacent the flange walls C are provided for positioning the flange walls C relative to the normal contour of the container body. FIGURES 2 and 3 illustrate this feature of the invention and show the flange walls C extending partially within and partially outward beyond the contour of the container body. Further, it will be seen that the combination of the corrugations and the flange walls C in the marginal edge portions of the container body serve to reinforce the side seam area. These reinforced edge portions rigidify the seam area to resist against any tendency of the edge portions to spring from a desired spaced apart welding position.

As a modified embodiment of the instant invention (FIG. 3), the flange walls C are formed to extend outwardly in substantially parallel spaced apart relation providing a gap E' which is uniform in width between the flange walls C. Other details of the marginal edge portions are identical to those of the preferred form (FIG. 2).

With the marginal edge portions of the can body prepared as hereinbefore described, the seam portions are brought together preparatory to welding them. For this purpose the flange walls C are positioned in spaced apart and parallel relationship between suitable guides to form the gaps E or E' and to retain the flange walls C against displacement (FIG. 1).

With the seam portions thus arranged, their terminal edges D are heated to a welding temperature. This heating action melts the terminal edges D to a molten condition. As the heating process continues, the upper portions of the flange walls C are reduced to molten metal which flows in and fills the gap between the upper portions of the flange walls C.

The flared edge portions D (FIG. 2) in the preferred form of the invention facilitate this welding operation. These edge portions provide a funnel or channel effect which allows the upper portions of the molten metal to flow freely between the flanged walls C without any tendency of restricting or squeezing out of the molten metal.

The welding of edge portions is both rapid and continuous along the entire length of the can body and thus produces a relatively smooth and fully welded seam F for the container body as illustrated in FIG. 4. For most requirements the container body may be considered satisfactory and any reforming that may be required would be confined to the ends of the container for the reception of the container end members. However, if a smooth exterior is preferred the container body may be expanded into true cylindrical form and the corrugations B subjected to a hammer blow to flatten them and produce a desired exterior for the container body as best illustrated in FIG. 5.

One form of apparatus for carrying out the steps for bending the marginal edge portions of the container body blank is shown in FIGS. 6 and 7. These views illustrate the forming of the corrugations B and the flanged wall C in the container body prior to welding. In this apparatus the flared sections of flange walls C and the inwardly curved wall portions of the corrugations B are first formed by clamping the marginal edge portions of the container body blank between a pair of cooperative bending die members 11, 12 (FIG. 6). A tongue 13 formed on the die member 11 serves as a stop element for locating the edges D of the body between the die members. The tongue 13 enters and is movable in a clearance slot 14 formed in the mating die member 12.

Following the forming of the flared sections of the walls C and the inwardly curved wall portions of the corrugations B, the marginal edge portions are bent further to form the outwardly curved wall portions of the corrugations B and to complete the forming of the flange wall C. For this purpose the partially formed marginal edge portions of the container body blank are placed in a die mechanism which includes a bending die 16 and a pair of spaced apart jaws 17 (FIG. 7). These jaws are first to move into position adjacent the container body and then the bending die moves up (as viewed in FIG. 7) against the marginal edge portions of the body and forces them outwardly against the jaws 17, bringing the flange walls C in a position where they will assume their radially divergent form when they are brought together, as illustrated in FIG. 2.

In order to produce the modified form of flange walls C which extend outwardly in parallel spaced apart relation as illustrated in FIG. 3, bending die members such as 11, 12 (FIG. 6), could be used for forming the terminal edges of the can body. These die members, however, would be provided with flat face to face surfaces adjacent the sides of the tongue 13, instead of the inwardly and upwardly curved sections (FIG. 6). In like manner the die mechanism shown in FIG. 7 would include jaws 17 having their inner faces extending vertically upward so that as the flange walls C are formed by the bending die 16 they would asssume the outwardly extended substantially parallel spaced apart walls as best illustrated in FIG. 3. In view of the minor modifications required in the apparatus and die mechanism (FIGS. 6 and 7) as hereinbefore described, no illustrations or further description are believed necessary.

Arranging a bringing together of the formed flange walls C for the welding operation may be effected in any suitable manner, as for example by well known forming wings or clamps associated with conventional can body forming machines. Such wings, clamps or suitable guides 21 (FIG. 1) may be utilized to support or hold the flange walls C of the can body in place for welding.

The welding of the terminal edges D of the flange walls C of the can body preferably is effected by gas-shielded fusion welding. For this purpose a direct-current arc 22 is established by a suitable non-consumable tungsten electrode 23 for heating the terminal edges D to a welding temperature. This electrode 23 is mounted in arc welding position in a shield torch 24 while a stream of suitable inert gas such as argon or helium gas shields the arc zone. The electrode 23 and the can body A, preferably adjacent the flared portion of the flange wall C, are connected to a suitable welding current source such as a generator G by lead wires 25, 26, for the establishment and maintenance of the arc 22 so that welding of the seam is accomplished.

The arc is established at one end of the terminal edges D of the body and the body or the electrode then is moved to cause the arc to travel the full length of the edges D to effect the full welding of the longitudinal side seams.

It is thought that the invention and many of its attendant advantages will be understood from the foregoing description and it will be apparent that various changes may be made in the form, construction, and arrangement of the parts and that changes may be made in the steps of the method described and their order of accomplishment without departing from the spirit and scope of the invention or sacrificing all of its material advantages, the form hereinbefore described being merely a preferred embodiment thereof.

I claim:

1. A method of producing a longitudinal side seam for a tubular metal container body comprising the steps of: longitudinally corrugating the opposite marginal edge portions of a container body blank; bending the terminal edges of said portions adjacent said corrugations into flange walls; supporting a container body partially formed into tubular configuration from said blank with said walls partially within and partially without the contour of said body and with a gap between said walls; directing a welding arc against the terminal edges of said flange walls, thereby fusing the edges of said flange walls into molten metal; causing said molten metal to flow into and fill the gap between the edges of said flange walls, thereby uniting said molten metal and said flange wall edges into a welded seam of said container body; and moving said container body relative to said welding arc to progressively weld the seam longitudinally of the container body.

2. The method of claim 1 wherein said flange walls are bent outwardly and are radially divergent.

3. The method of claim 1 wherein said welding arc and the adjacent area are shielded with an inert gas.

4. The method of claim 3 wherein said inert gas is flowed about said welding arc and adjacent area.

5. The method of claim 1 wherein said welding arc is produced by an electric current.

6. A method of producing a longitudinal side seam tubular metal container body comprising the steps of: bending the opposite marginal edge portions of a partially formed container body into inwardly curved body sections and into outwardly extended, spaced, flange walls; supporting the container body to provide a gap between said flange walls; directing a welding arc against the terminal edges of said flange walls, thereby fusing the edges of said flange walls into molten metal; causing said molten metal to flow into and fill the gap between the edges of said flange walls, thereby uniting said molten metal and said flange wall edges into a welded seam of said container body; and moving said container body relative to said welding arc to progressively weld the seam longitudinally of the container body.

References Cited in the file of this patent

UNITED STATES PATENTS

| | | |
|---|---|---|
| 2,515,179 | Barger | July 18, 1950 |
| 2,819,517 | Pursell | Jan. 14, 1958 |